United States Patent
Itakura et al.

(10) Patent No.: US 11,609,447 B2
(45) Date of Patent: Mar. 21, 2023

(54) DISPLAY DEVICE

(71) Applicant: Japan Display Inc., Tokyo (JP)

(72) Inventors: Shimon Itakura, Tokyo (JP); Yuzo Ota, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/873,156

(22) Filed: Jul. 26, 2022

(65) Prior Publication Data
US 2023/0031286 A1     Feb. 2, 2023

(30) Foreign Application Priority Data

Jul. 27, 2021   (JP) .............................. JP2021-122567

(51) Int. Cl.
    *G02F 1/1333*   (2006.01)
    *G02F 1/1335*   (2006.01)
    *G02F 1/1347*   (2006.01)

(52) U.S. Cl.
    CPC ...... *G02F 1/133328* (2021.01); *G02F 1/1347* (2013.01); *G02F 1/133528* (2013.01); *G02F 2202/16* (2013.01); *G02F 2203/48* (2013.01)

(58) Field of Classification Search
    CPC .............................................. G02F 1/133328
    See application file for complete search history.

(56) References Cited

U.S. PATENT DOCUMENTS

| | | | |
|---|---|---|---|
| 2014/0307475 A1* | 10/2014 | Urano ................. | G02B 6/0091 362/613 |
| 2018/0031897 A1 | 2/2018 | Kikuchi et al. | |
| 2018/0164622 A1* | 6/2018 | Ono ................. | G02F 1/136286 |

FOREIGN PATENT DOCUMENTS

JP        2018-18043 A      2/2018

* cited by examiner

*Primary Examiner* — Edmond C Lau
(74) *Attorney, Agent, or Firm* — Xsensus LLP

(57) ABSTRACT

According to one embodiment, a display device includes a liquid crystal display panel including a first substrate, a second substrate, a first liquid crystal layer, a first polarizer and a second polarizer, a dimming panel including a third substrate, a fourth substrate, a second liquid crystal layer, a third polarizer and a fourth polarizer, a first transparent conductive layer provided on the first substrate, a conductive tape connected to the first transparent conductive layer and a first metal frame formed of a metal material, and the conductive tape is connected to the first metal frame.

4 Claims, 7 Drawing Sheets

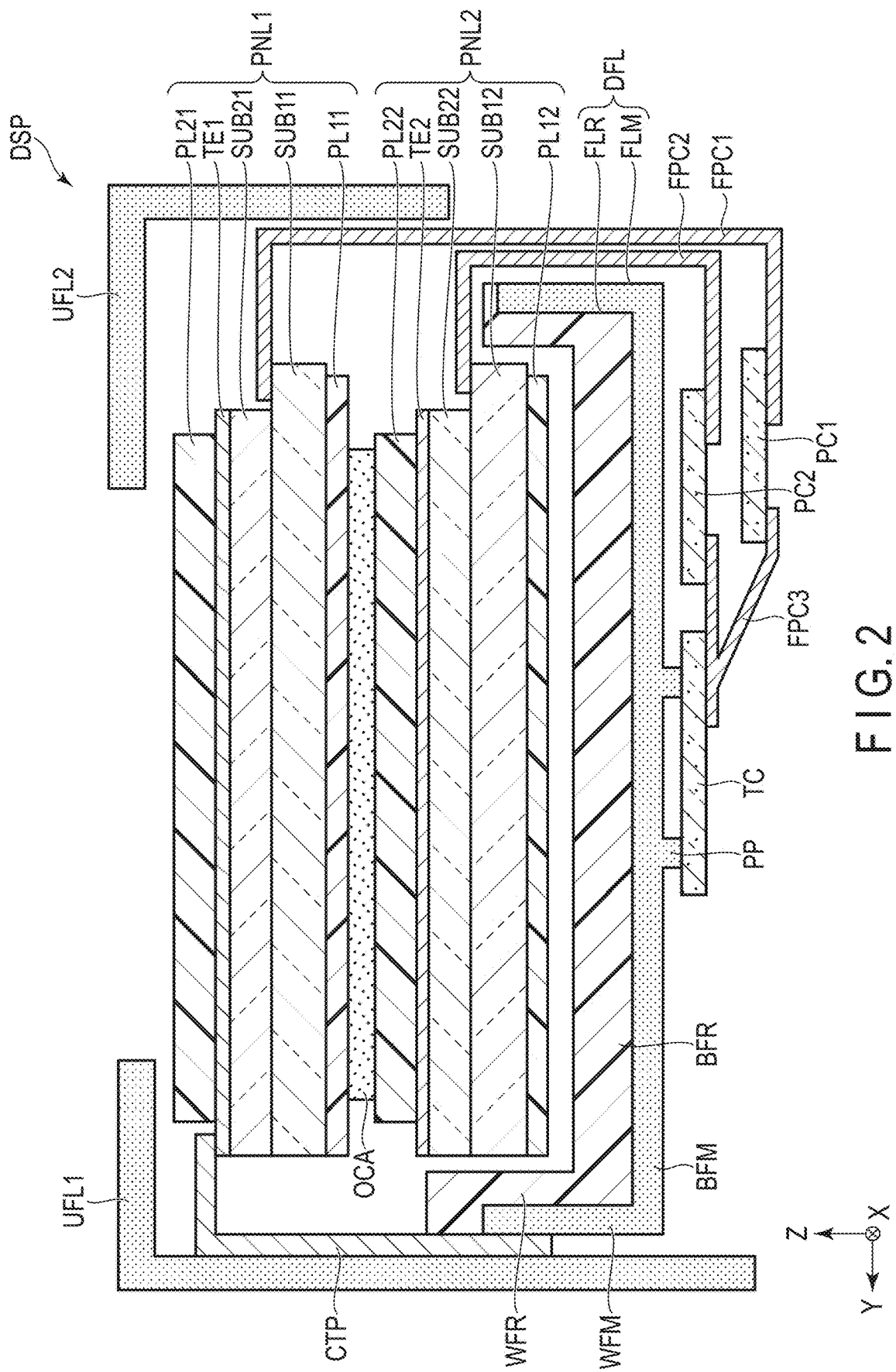
F I G. 2

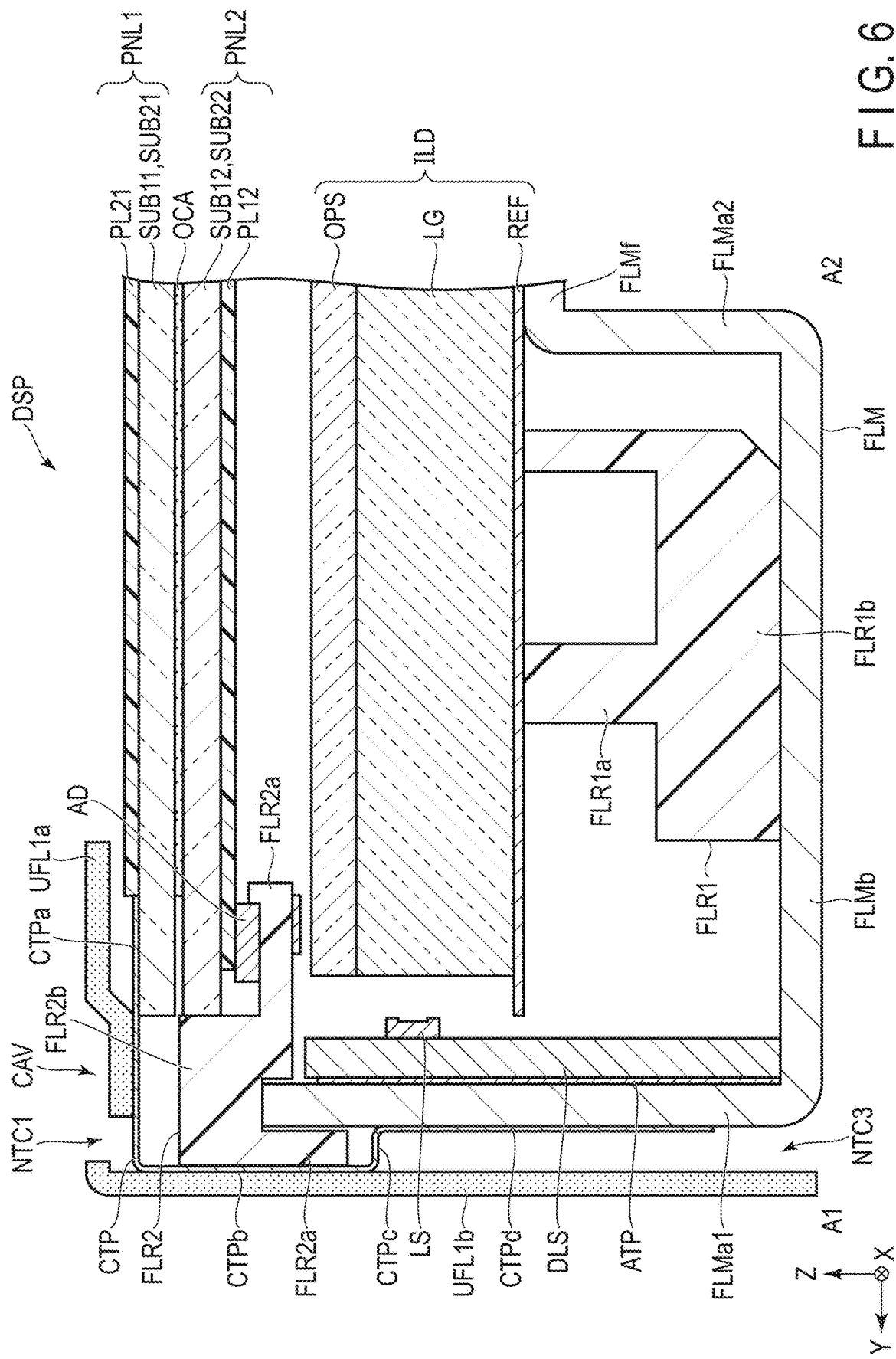

DISPLAY DEVICE

CROSS-REFERENCE TO RELATED APPLICATIONS

This application is based upon and claims the benefit of priority from Japanese Patent Application No. 2021-122567 filed Jul. 27, 2021, the entire contents of which are incorporated herein by reference.

FIELD

Embodiments described herein relate generally to a display device.

BACKGROUND

In recent years, such technologies are being developed that use a display panel for dimming in addition to a display panel for image display in order to improve the contrast of the display device.

BRIEF DESCRIPTION OF THE DRAWINGS

FIG. 2 is a cross-sectional view schematically showing an example of the display device.

FIG. 6 is a cross-sectional view showing the display device shown in FIG. 5A, taken along line A1-A2.

DETAILED DESCRIPTION

Figure 1:
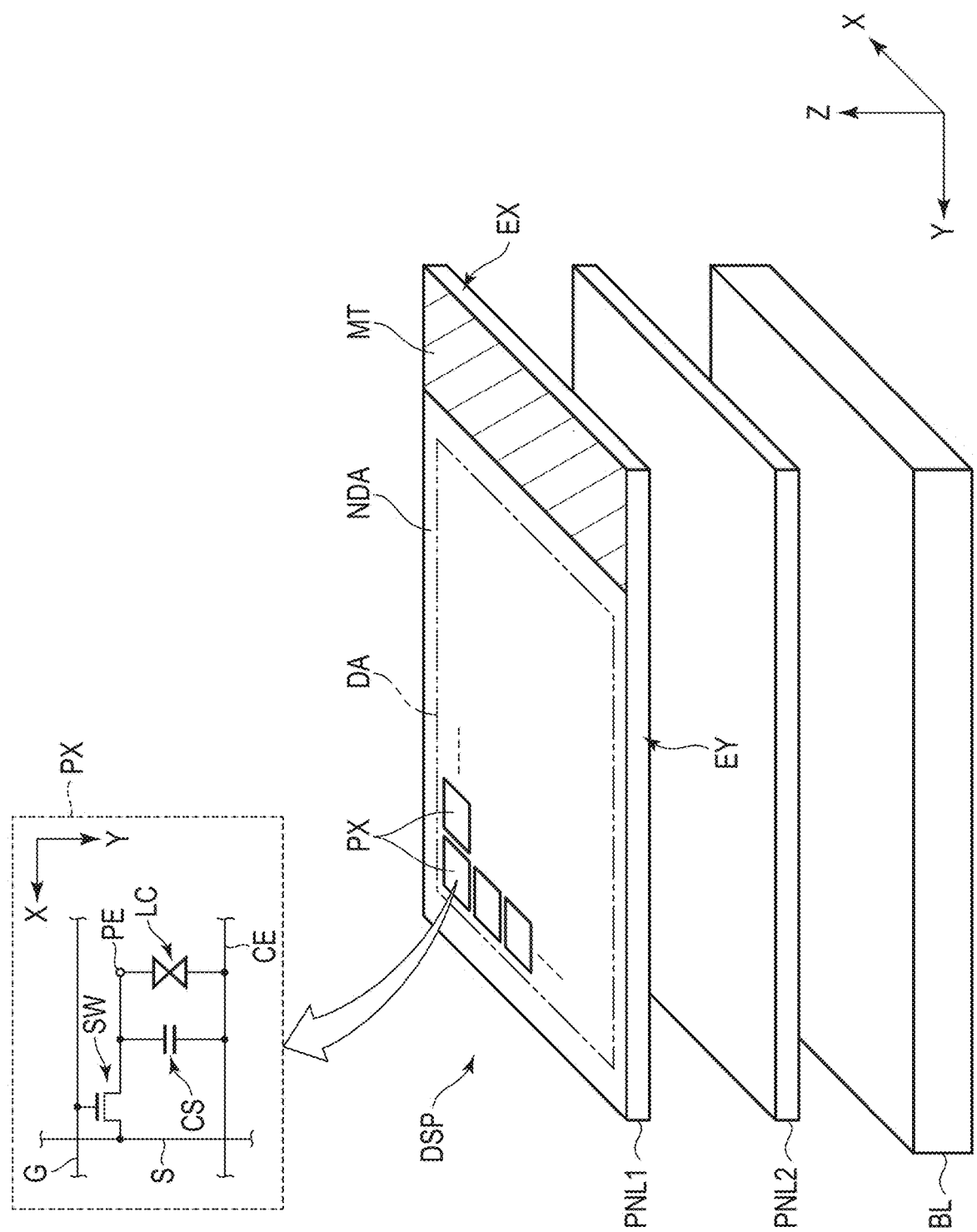
FIG. 1 is an exploded perspective view schematically showing a configuration of diagram of a display device comprising two display panels.

In general, according to one embodiment, a display device comprises a liquid crystal display panel including a first substrate, a second substrate, a first liquid crystal layer interposed between the first substrate and the second substrate, a first polarizer and a second polarizer, a dimming panel including a third substrate, a fourth substrate, a second liquid crystal layer interposed between the third substrate and the fourth substrate, a third polarizer and a fourth polarizer, a first transparent conductive layer provided on the first substrate, a conductive tape connected to the first transparent conductive layer and a first metal frame formed of a metal material, wherein the conductive tape is connected to the first metal frame.

An object of the embodiment is to provide a display device which can control electrostatic charge.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof may be omitted unless otherwise necessary.

A display device according to one embodiment will now be described with reference to the accompanying drawings.

In this embodiment, a first direction X, a second direction Y and a third direction Z are orthogonal to each other, but they may intersect at an angle other than 90 degrees. In the following descriptions, a direction forwarding a tip of an arrow indicating the third direction Z is referred to as "above" or "upward" and a direction forwarding oppositely from the tip of the arrow is referred to as "below" or "downward". Note that the first direction X, the second direction Y and the third direction Z may be referred to as an X direction, a Y direction and a Z direction, respectively.

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the display device on a tip side of an arrow in a third direction Z, and viewing from this observation position toward the X-Y plane defined by the first direction X and the second direction Y is referred to as a planar view. Viewing a cross section of the display device in an X-Z plane defined by the first direction X and the third direction Z or a Y-Z plane defined by the second direction Y and the third direction Z is referred to as a cross-sectional view.

[Embodiment]

FIG. 1 is an exploded perspective view schematically showing a display device comprising two display panels. FIG. 1 illustrates a three-dimensional space defined by the first direction X, the second direction Y perpendicular to the first direction X, and the third direction Z perpendicular to the first direction X and the second direction Y.

As shown in FIG. 1, the display device DSP comprises a liquid crystal display panel PNL1, a dimming panel PNL2 and a backlight unit BL. As shown in FIG. 1, the dimming panel PNL2 is positioned between the liquid crystal display panel PNL1 and the backlight unit BL, and with this configuration, the contrast of the image displayed on the liquid crystal display panel PNL1 can be improved.

The liquid crystal display panel PNL1 is, for example, rectangular. In the example illustrated, an short side EX of the liquid crystal display panel PNL1 is parallel to the first direction X, and a long side EY of the liquid crystal display panel PNL1 is parallel to the second direction Y. The third direction Z is equivalent to the thickness direction of the liquid crystal display panel PNL1. A main surface of the liquid crystal display panel PNL1 is parallel to the X-Y plane defined by the first direction X and the second direction Y. The liquid crystal display panel PNL1 includes a display area DA and a non-display area NDA located on an outer side of the display area DA. The non-display area NDA includes a terminal area MT in which a driver IC and a flexible circuit board are mounted. In FIG. 1, the terminal area MT is indicated by shaded lines.

The display area DA is an area for displaying images and comprises a plurality of pixels PX arranged in a matrix, for example. As shown enlarged in FIG. 1, each pixel PX is arranged in the respective region compartmentalized by the respective scanning lines G and the respective signal lines S, and comprises a switching element SW, a pixel electrode PE, a common electrode CE, a liquid crystal layer LC and the like.

The switching element SW is constituted by, for example, a thin-film transistor (TFT) and is electrically connected to the respective scanning line G and the respective signal line S. Each scanning line G is electrically connected to the switching elements SW of those of the pixels PX, which are aligned along the first direction X. Each signal line S is electrically connected to the switching element SW of those of the pixels PX, which are aligned along the second direction Y. The pixel electrode PE is electrically connected to the switching element SW. Each of the pixel electrodes PE opposes the common electrode CE, and the liquid crystal layer LC is driven by the electric field generated between the respective pixel electrode PE and the common electrode CE. A capacitance CS is formed, for example, between an electrode of the same potential as that of the common electrode CE and an electrode of the same potential as that of the pixel electrode PE.

The terminal area MT extends along the short side EX of the liquid crystal display panel PNL1. A terminal portion is formed in the terminal area MT, and the liquid crystal display panel PNL1 is electrically connected to an external device, such as a flexible circuit board via the terminal portion.

Although the illustration of the detailed configuration is omitted in FIG. 1, the dimming panel PNL2 has basically the same configuration as that of the liquid crystal display panel PNL1. The detailed configurations of the liquid crystal display panel PNL1 and dimming panel PNL2 will be provided later, together with the explanations of FIGS. 2 and 3.

The backlight unit BL is disposed below the dimming panel PNL2, and light from this backlight unit BL is controlled for each pixel PX to display images.

FIG. 2 is a cross-sectional view schematically showing an example of the display device. The display device DSP shown in FIG. 2 comprises a liquid crystal display panel PNL1, a dimming panel PNL2, an adhesive layer OCA, a resin frame FLR, a frame FLM, an upper frame UFL1, an upper frame UFL2 and a conductive tape CTP. Although not shown in the figure, between the resin frame FLR and the dimming panel PNL2, an illumination device, the so-called backlight, is provided. As to the specific configuration of the backlight, it is similar to that of FIG. 6, which will be described later. The resin frame FLR and the frame FLM constitute a lower frame DFL.

The upper frame UFL1 and the upper frame UFL2 appear to be separated in the drawing, but they are connected together to constitute a single frame. The upper frame UFL1 and the upper frame UFL2 are formed of a metal material. The upper frame UFL1 and the upper frame UFL2 may was well be referred to as metal frames.

The liquid crystal display panel PNL1 comprises a first substrate SUB11, a second substrate SUB21, a transparent conductive layer TE1, a first polarizer PL11, a second polarizer PL21, a flexible printed circuit FPC1 and a printed circuit board PC1.

The dimming panel PNL2 comprises a first substrate SUB12, a second substrate SUB22, a transparent conductive layer TE2, a first polarizer PL12, a second polarizer PL22, a flexible printed circuit FPC2 and a printed circuit board PC2.

The flexible printed circuit FPC1 is connected to the terminal portion of the first substrate SUB 11. The flexible printed circuit FPC1 is provided in contact with the printed circuit board PC1.

The flexible printed circuit FPC2 is connected to the terminal portion of the first substrate SUB12. The flexible printed circuit FPC2 is provided in contact with the printed circuit board PC2.

Further, a flexible printed circuit FPC3 is provided in contact with the printed circuit boards PC1 and PC2. To the flexible printed circuit FPC3, a wiring substrate TC is connected. Synchronous signals from the wiring substrate TC are input to the printed circuit boards PC1 and PC2 via the flexible printed circuit FPC3. From the printed circuit board PC1, signals are input to the liquid crystal display panel PNL1 via the flexible printed circuit FPC1. From the printed circuit board PC2, signals are input to the dimming panel PNL2 via the flexible printed circuit FPC2. With these signals, the liquid crystal display panel PNL1 and the dimming panel PNL2 are driven.

The resin frame FLR includes a bottom portion and a wall portion WFR. The bottom portion BFR has a rectangular shape which expand in the X-Y plane. The wall portion WFR protrudes from an end portion of the bottom portion BFR along the third direction Z.

The frame FLM includes a bottom portion BFM and a wall portion WFM. The bottom portion BFM has a rectangular shape which expands in the X-Y plane. The wall portion WFM protrudes from an end portion of the bottom portion BFM along the third direction Z.

The resin frame FLR is disposed inside the space formed by the bottom portion BFR and the wall portion WFR of the frame FLM. The bottom portion BFR of the resin frame FLR is in contact with the bottom portion BFM of the frame FLM. The wall portion WFR of the resin frame FLR is in contact with the wall portion WFM of the frame FLM. The frame FLM is formed of a metal material and may as well be referred to as a metal frame.

A surface of the bottom portion BFM of frame FLM, which is not in contact with the resin frame FLR, is provided with a projecting portion PP. The wiring substrate TC is provided in contact with the projecting portion PP.

Figure 3:
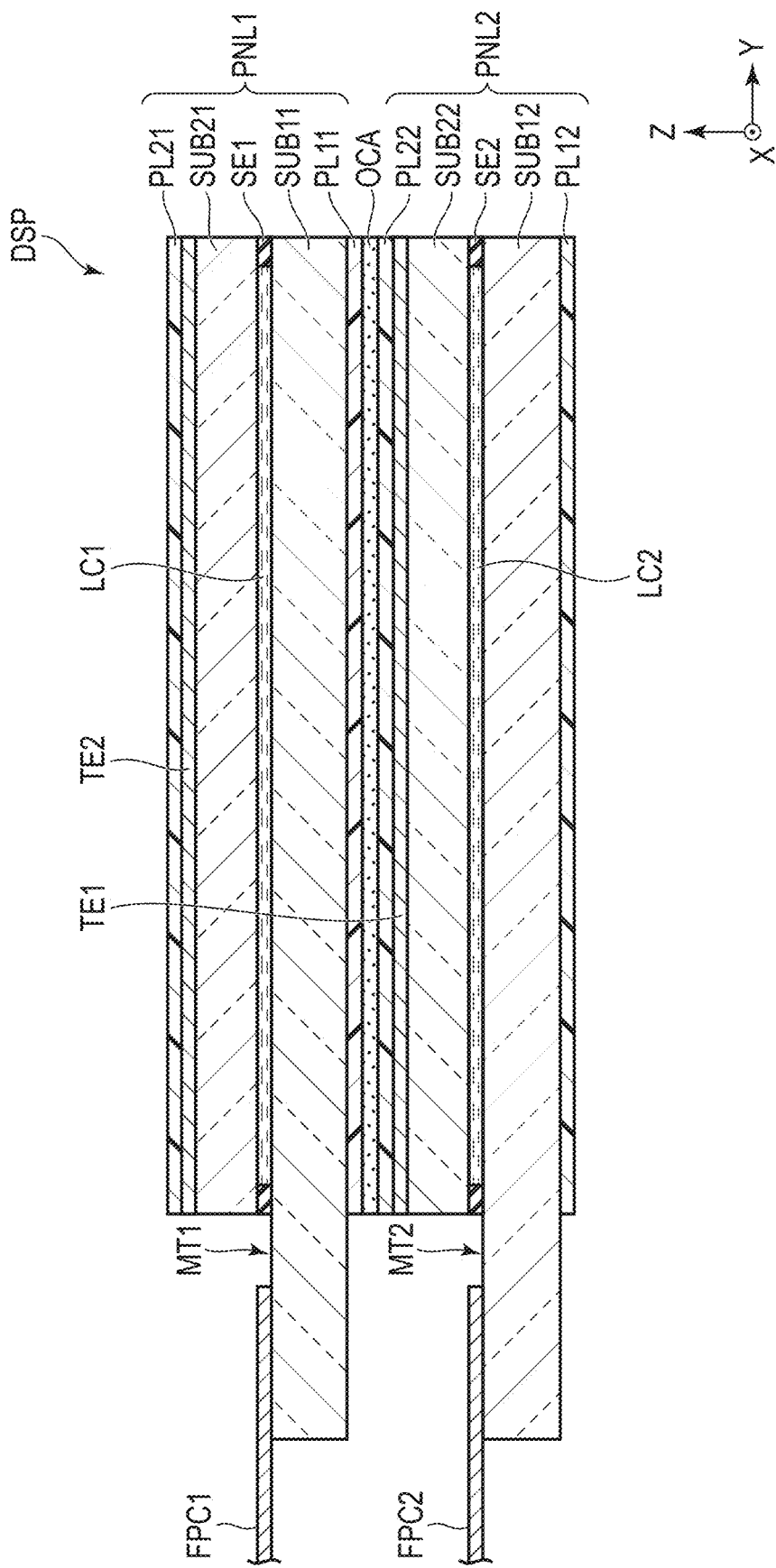
FIG. 3 is a cross-sectional view schematically showing a stacking configuration of a liquid crystal display panel and a dimming panel.

FIG. 3 is a cross-sectional view schematically showing a stacking configuration of the liquid crystal display panel and the dimming panel. As described above, the display device DSP comprises a liquid crystal display panel PNL1 and a dimming panel PNL2. The liquid crystal display panel PNL1 and the dimming panel PNL2 are adhered together by, for example, a transparent adhesive layer OCA. Note that the configurations common to the liquid crystal display panel PNL1 and the dimming panel PNL2 are positioned with respect each other so that they are superimposed on each other in plan view and adhered together by the adhesive layer OCA.

The detailed configuration of the liquid crystal display panel PNL1 will now be described.

As shown in FIG. 3, the liquid crystal display panel PNL1 comprises a first substrate SUB11, a second substrate SUB21, a liquid crystal layer LC1, a transparent conductive layer TE1, a first polarizer PL11 and a second polarizer PL21.

The liquid crystal layer LC1 is sandwiched between the first substrate SUB11 and the second substrate SUB21, and sealed by a sealant SE1. The first polarizer PL11 is placed under the first substrate SUB11 and the second polarizer PL21 is placed above the second substrate SUB21. The polarization axes of the first polarizer PL11 and the second polarizer PL21 are located, for example, in a cross-Nicol relationship with respect to each other, that is, 90 degrees.

Between the second substrate SUB21 and the second polarizer PL21, a transparent conductive layer TE1 is provided in contact with the second substrate SUB21. With the transparent conductive layer TE1 thus provided, it is possible to prevent the liquid crystal display panel PNL1 from being charged by static electricity. The details thereof will be described later.

In the terminal area MT1 of the liquid crystal display panel PNL1, the flexible printed circuit board FPC1 is mounted.

Next, the detailed configuration of the dimming panel PNL2 will be described.

As shown in FIG. 3, the dimming panel PNL2, similar to the liquid crystal display panel PNL1, comprises a first substrate SUB12, a second substrate SUB22, a liquid crystal layer LC2, a transparent conductive layer TE2, a first polarizer PL12 and a second polarizer PL22.

The liquid crystal layer LC2 is sandwiched between the first substrate SUB12 and the second substrate SUB22 and sealed by a sealant SE2. The first polarizer PL12 is placed under the first substrate SUB12 and the second polarizer PL22 is placed above the second substrate SUB22. The polarization axes of the first polarizer PL12 and the second polarizer PL22 are located, for example, in a cross-Nicol relationship with respect to each other, that is, 90 degrees. Further, the polarization axis of the first polarizer PL11 of the liquid crystal display panel PNL1 and the polarization axis of the second polarizer PL22 of the dimming panel PNL2 are in the same direction.

Between the second substrate SUB22 and the second polarizer PL22, the transparent conductive layer TE2 is provided in contact with the second substrate SUB22. The details of the transparent conductive layer TE2 will be described later.

In the terminal area MT2 of the dimming panel PNL2, the flexible printed circuit board FPC2 is mounted.

With reference back to FIG. 2, the details of the countermeasures against static electricity in the liquid crystal display panel PNL1 and the dimming panel PNL2 will now be described. In liquid crystal display panel PNL1, a conductive tape CTP is connected to the transparent conductive layer TE1. The conductive tape CTP is in contact with the frame FLM and the upper frame UFL1. That is, the transparent conductive layer TE1 is electrically connected to the frame FLM and the upper frame UFL1 via the conductive tape CTP. Since the frame FLM and the upper frame UFL1 are formed of a metal material, if even the liquid crystal display panel PNL1 is charged with static electricity, the static electricity is discharged to the frame FLM and the upper frame UFL1 via the conductive tape CTP. Note here that if the conductive tape CTP is connected to at least the frame FLM, static electricity can be discharged.

On the other hand, the dimming panel PNL2 as well is provided the transparent conductive layer TE2, but the transparent conductive layer TE2 is not electrically connected to frame FLM and the upper frame UFL1. The transparent conductive layer TE2 is in an electrically floating state.

Static electricity charged on the display device DSP is generated when the protective film to which the polarizer is attached is peeled off when the polarizer is attached to the panel. The dimming panel PNL2 is attached to the liquid crystal display panel PNL1 by the adhesive layer OCA with the polarizer being attached thereto. With this configuration, the dimming panel PNL2 is not charged with static electricity. Therefore, the transparent conductive layer TE2 may be in an electrically floating state.

Here, there is no need to attach a conductive tape to the dimming panel PNL2 to be connected to the transparent conductive layer TE2. With this configuration, it is possible to reduce the manufacturing process and the manufacturing cost of the display device DSP.

In this embodiment, the transparent conductive layer TE1 provided on the liquid crystal display panel PNL1 and the frame FLM are connected together, and thus it is possible to provide a display device which can suppress electrostatic charging.

<Configuration Example 1>

Figure 4:
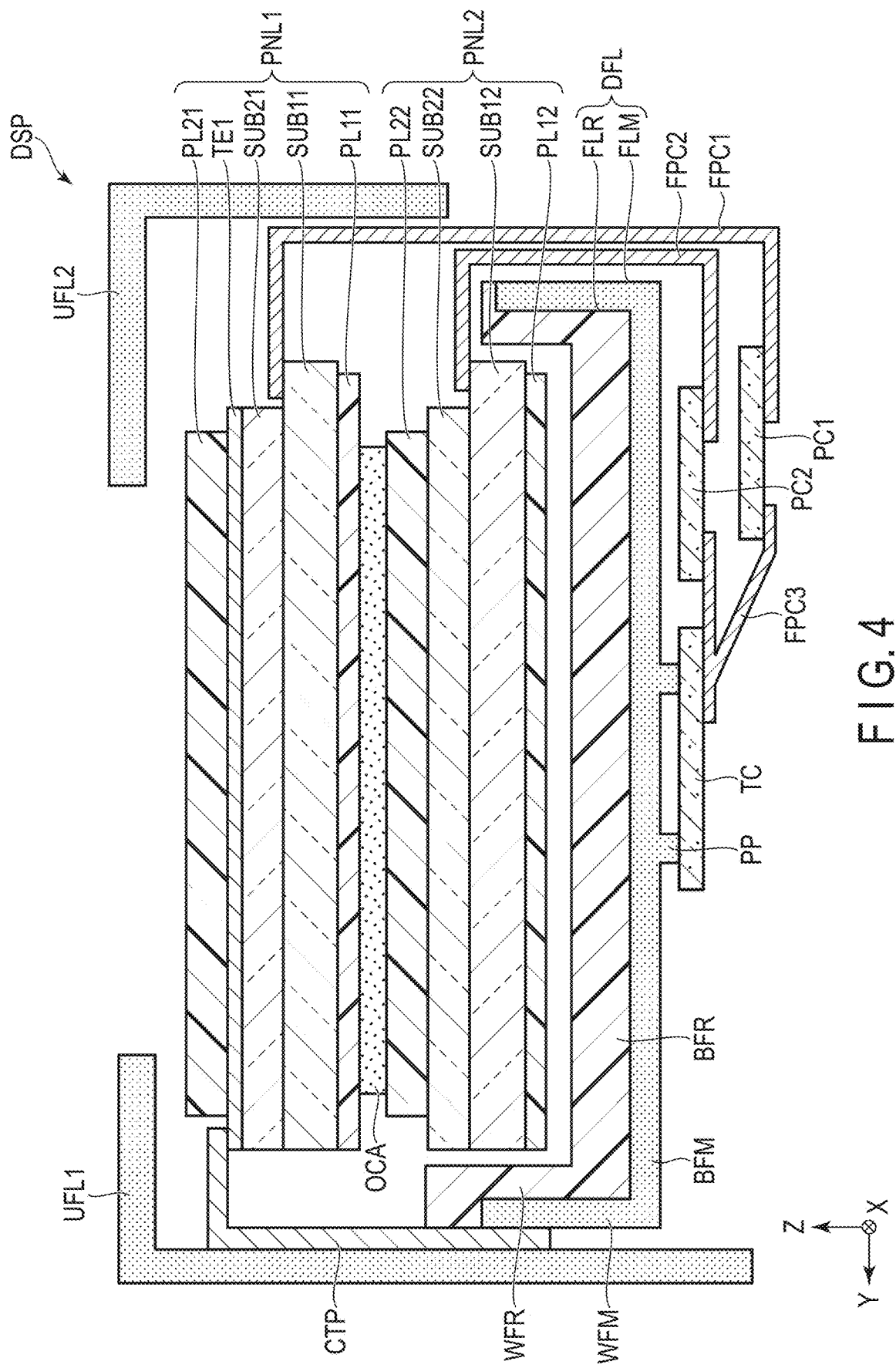
FIG. 4 is a cross-sectional view showing another configuration example of the display device in the embodiment.

FIG. 4 is a cross-sectional view of another configuration example of the display device in the embodiment. The configuration example shown in FIG. 4 is different from that of FIG. 2 in that the transparent conductive layer of the dimming panel PNL2 is not provided.

In the display device DSP shown in FIG. 4, between the second substrate SUB22 and the second polarizer PL22 of the dimming panel PNL2, no transparent conductive layer is provided. The other configurations of the display device DSP shown in FIG. 4 are similar to those shown in FIG. 2, the details thereof will be omitted as to be replaced by the explanation in FIG. 2.

As described above, when attaching the liquid crystal display panel PNL1, the dimming panel PNL2 is not charged with static electricity. Therefore, even if a transparent conductive layer is not provided on the dimming panel PNL2, changing with static electricity can be suppressed if the transparent conductive layer TE1 is provided on the liquid crystal display panel PNL1.

In this configuration example as well, advantageous effects similar to those of the embodiment can be exhibited.

<Configuration Example 2>

Figure 5A:
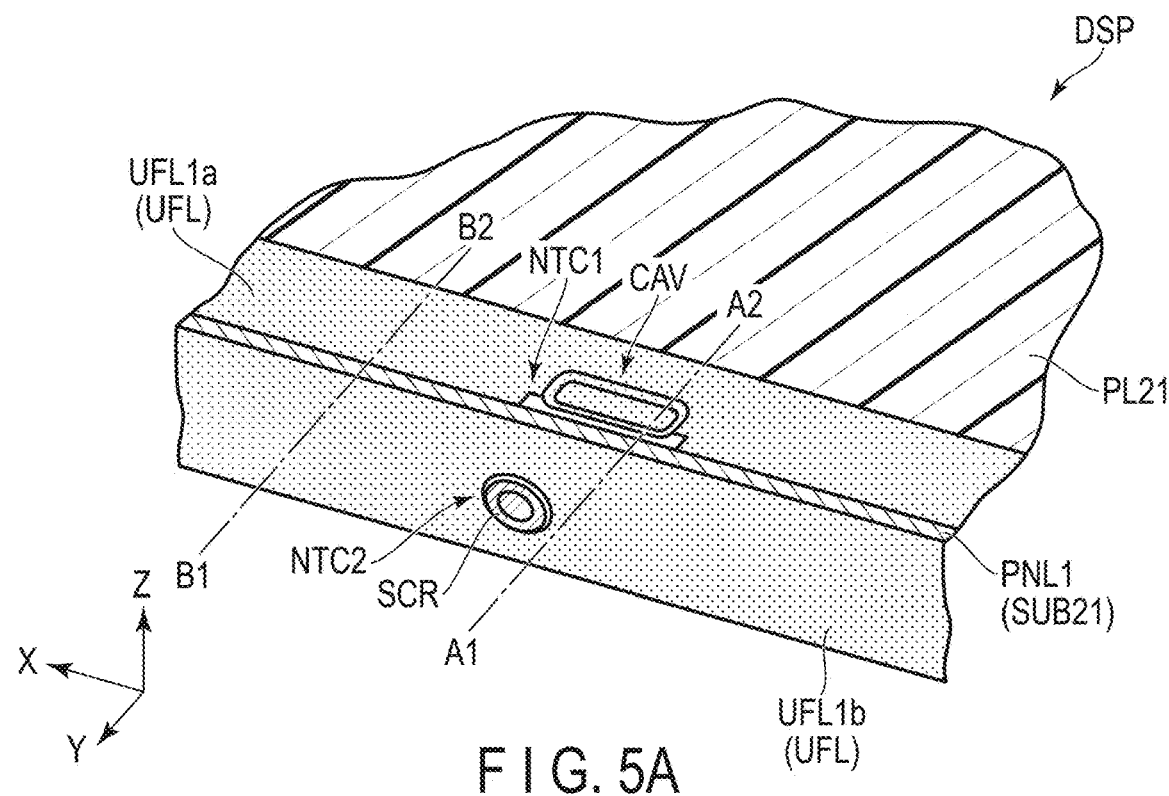
FIG. 5A is a perspective view showing another configuration example of the display device in the embodiment.
Figure 5B:
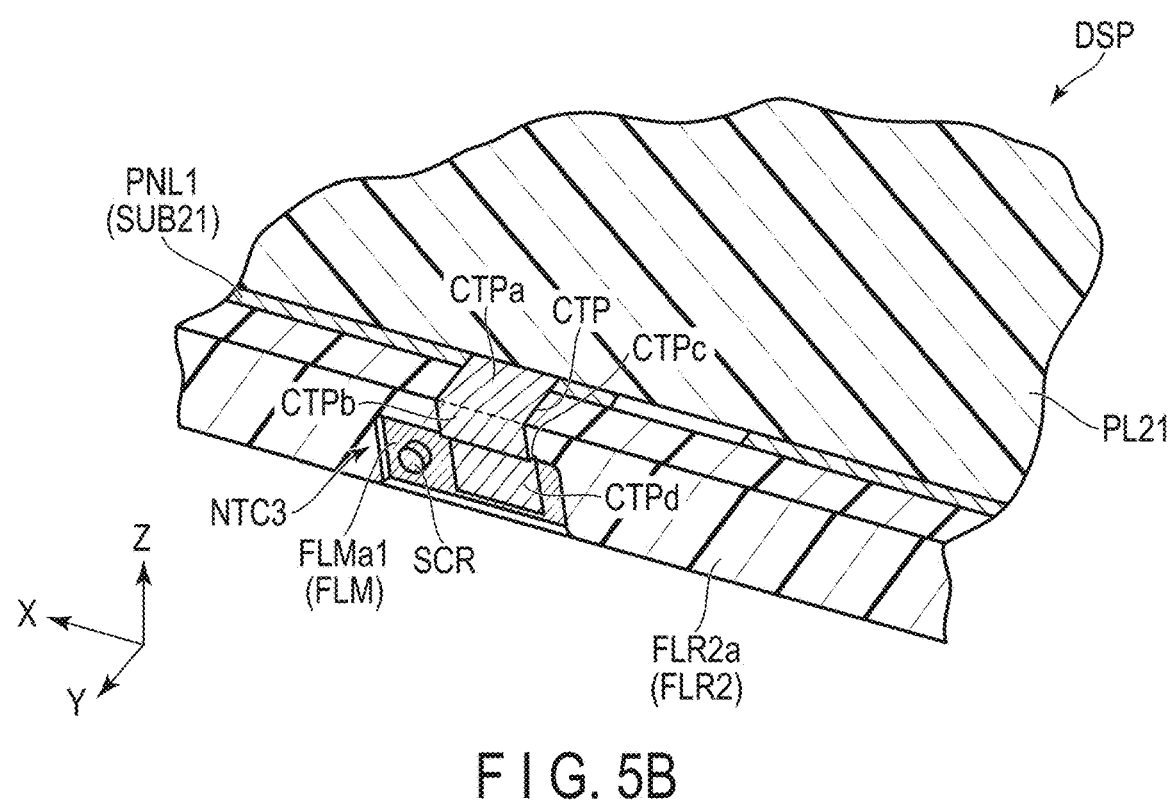
FIG. 5B is a perspective view showing another configuration example of the display device in the embodiment.

FIGS. 5A and 5B are each a perspective view showing another configuration example of the display device in the embodiment. In this configuration example, the detailed configurations of the conductive tape and its surroundings will be described.

FIG. 5A is a perspective view of a part of the display device DSP. FIG. 5A shows a flat portion UFL1*a* and a wall portion UFL1*b*, which are parts of the upper frame UFL, and the second substrate SUB12 and the second polarizer PL21 of the liquid crystal display panel PNL1. The flat portion UFL1*a* and the wall portion UFL1*b* are formed of plate-like metal materials expanding along the X-Y plane and the X-Z plane, respectively.

In the flat portion UFL1*a*, a recess portion CAV and a notch portion NTC1 are formed. In the wall portion UFL1*b*, a notch portion NTC2 is formed. Inside the notched portion NTC2, a stopper SCR is placed, which is fit into the frame FLM, as will be described later.

FIG. 5B is a partially enlarged view of FIG. 5A. Note that in FIG. 5B, some of the structural components of the display device DSP are omitted from the illustration to make the drawing easier to read. For example, the upper frame UFL (the flat portion UFL1*a* and the wall portion UFL1*b*) is omitted.

The conductive tape CTP is provided in contact with the liquid crystal display panel PNL1. The conductive tape CTP includes a first portion CTPa, a second portion CTPb, a third portion CTPc and a fourth portion CTPd.

The first portion CTPa, the second portion CTPb, the third portion CTPc and the fourth portion CTPd are provided along the X-Y plane, the X-Z plane, the X-Y plane and the X-Z plane, respectively. The first portion CTPa is in contact with the transparent conductive layer (not shown) of the liquid crystal display panel PNL1. The details of these portions will be described later.

The first portion FLR2 of the resin frame FLR2 includes a notch portion NTC3 formed therein. Inside the notch portion NTC3, the wall portion FLMa1 of the frame FLM and the stopper SCR are provided. The stopper SCR fixes the upper frame UFL, the frame FLM and the resin frame FLR2. Note that the details of the wall portion FLMa1 will be described later.

FIG. 6 is a cross-sectional view of the display device shown in FIG. 5A, taken along line A1-A2.

As shown in FIG. 6, the display device DSP comprises a frame FLM, a resin frame FLR1, an illumination device ILD, a dimming panel PNL2, a liquid crystal display panel PNL1, an adhesive layer OCA, a light source element LS, a wiring substrate DLS, an adhesive tape ATP, a frame FLM, a resin frame FLR2, a flat portion UFL1a and a wall portion UFL1b of an upper frame UFL1 and a conductive tape CTP. The illumination device ILD is similar to the backlight unit BL in FIG. 1.

The frame FLM includes a bottom portion FLMb, a wall portion FLMa1, a wall portion FLMa2 and a flat portion FLMf. The bottom portion FLMb expands along the X-Y plane. The wall portions FLMa1 and FLMa2 extend from an end portion of the bottom portion FLMb along the X-Z plane. The flat portion FLMf expands from an end portion of the wall section FLMa2 along the along the X-Y plane.

The resin frame FR1 is provided in contact with the bottom portion FLMb of the frame FLM. The resin frame FR1 includes a bottom portion FR1b and a plurality of protruding portions FR1a. The protruding portions FR1a are in contact with the illumination device ILD to support it.

The illumination device ILD comprises a reflective sheet REF, a light guide LG, an optical sheet OPS, a light source element LS and a wiring substrate DLS. The reflective sheet REF, the light guide LG and the optical sheet OPS are arranged in this order along the third direction Z. The light source element LS is disposed to oppose a side surface of the light guide LG. The light source element LS is connected to the wiring substrate DLS. The wiring substrate DLS is adhered to the wall portion FLMa1 of the frame FLM by the adhesive tape ATP.

The optical sheet OPS is, for example, a prism sheet or a diffusion sheet. Further, for example, it suffices if two prism sheets and one diffusion sheet are as the optical sheet OPS.

The resin frame FLR2 includes a first portion FLR2a, a second portion FLR2b and a third portion FLR2c, which expand along the X-Z plane, the X-Y plane, and the X-Z plane, respectively. The first portion FLR2a is provided in contact with the second portion CTPb of the conductive tape CTP as described above. Since the notch portion NTC3 is provided in the resin frame FLR2, the first portion FLR2a is in contact with a part of the wall portion FLMa1 of the frame FLM, but not with its entirety. The second portion FLR2b interpose the wall portion FLMa1 of the frame FLM. The third portion FLR2c includes a fixing member AD in contact with the first polarizer PL12. The third portion FLR2c and the fixing member AD fix the dimming panel PNL2 including the first polarizer PL12.

The first portion CTPa of the conductive tape CTP is pressed against and fixed to the liquid crystal display panel PNL1 by the recessed portion CAV of the upper frame UFL1.

The second portion CTPb is fixed between the wall portion UFL1b and the first portion FLR2a of the resin frame FLR2 by the wall portion UFL1b of the upper frame UFL1. The fourth portion CTPd is in contact with the wall portion FLMa1 of the frame FLM.

As described above, the first portion CTPa of the conductive tape CTP is fixed to the transparent conductive layer of the liquid crystal display panel PNL1, and further the fourth portion CTPd is connected to the wall portion FLMa1 of the frame FLM. With this configuration, static electricity charged on the liquid crystal display panel PNL1 is discharged via the conductive tape CTP to the frame FLM.

Further, the conductive tape CTP is connected by the recess portion CAV and the wall portion UFL1b of the upper frame UFL1, and therefore there is no risk of displacement in position.

Figure 7:
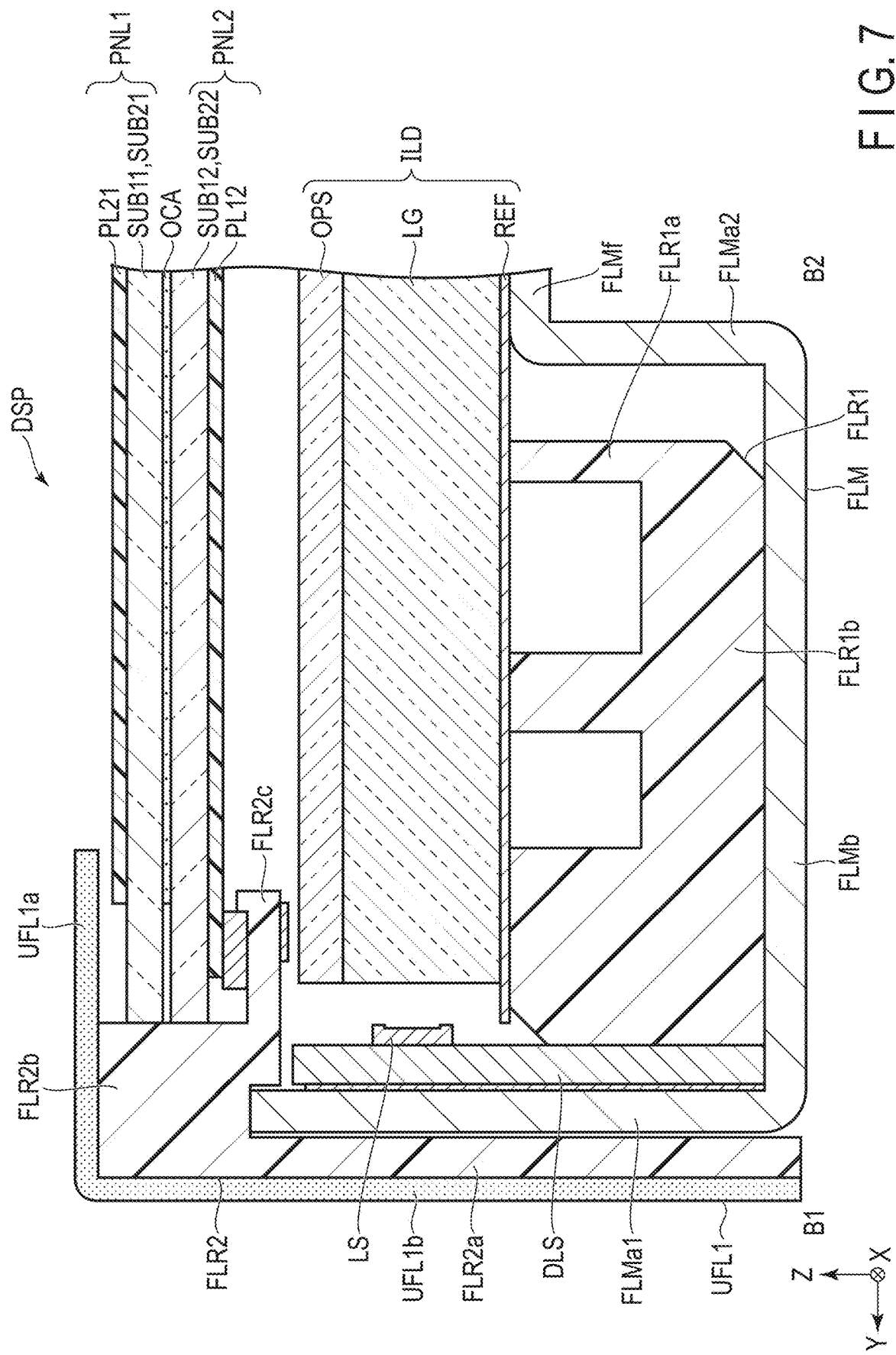
FIG. 7 is a cross-sectional view showing the display device shown in FIG. 5A, taken along line B1-B2.

FIG. 7 is a cross-sectional view of the display device shown in FIG. 5A, taken along line B1-B2. For FIG. 7, only the different point from those of FIG. 6 will be described.

In FIG. 7, since separated from the notch portion NTC3, the first portion of FLR2a of the resin frame FLR2 is in contact with the entirety of the wall portion FLMa1 of the frame FLM.

Here, since separated from the recess portion CAV and the notched portion NTC1 of the upper frame UFL1, the flat portion UFL1a is formed of a flat sheet metal that expands along the X-Y plane.

In this configuration example as well, advantageous effects similar to those of the embodiment can be exhibited.

In this disclosure, the frame FLM may as well be referred to as the first metal frame and the upper frame UFL may as well be referred to as the second metal frame.

The first substrate SUB12 and the second substrate SUB22 of the dimming panel PNL2 may as well be referred to as the third substrate and the fourth substrate, respectively. The first polarizer PL12 and the second polarizer PL22 may as well be referred to as the third and fourth polarizers, respectively.

The transparent conductive layers TE1 and TE2 may as well be referred to as the first transparent conductive layer and the second transparent conductive layer, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a liquid crystal display panel including a first substrate, a second substrate, a first liquid crystal layer interposed between the first substrate and the second substrate, a first polarizer and a second polarizer;
   a dimming panel including a third substrate, a fourth substrate, a second liquid crystal layer interposed between the third substrate and the fourth substrate, a third polarizer and a fourth polarizer;

a first transparent conductive layer provided on the first substrate;

a conductive tape connected to the first transparent conductive layer; and a first metal frame formed of a metal material, wherein the conductive tape is connected to the first metal frame.

2. The display device according to claim 1, further comprising:

a second transparent conductive layer provided on the third substrate, wherein the second transparent conductive layer is in an electrically floating state.

3. The display device according to claim 1, wherein the liquid crystal display panel is provided between the first metal frame and the dimming panel.

4. The display device according to claim 1, further comprising:

a second metal frame formed of a metal material, wherein the liquid crystal display panel is provided between the first metal frame and the dimming panel, the second metal frame includes a recess portion, and the conductive tape is fixed by the recess portion.

* * * * *